J. A. RICKETTS.
PHOTOGRAPHIC APPARATUS.
APPLICATION FILED MAY 11, 1915.
1,250,354.
Patented Dec. 18, 1917.
3 SHEETS—SHEET 1.
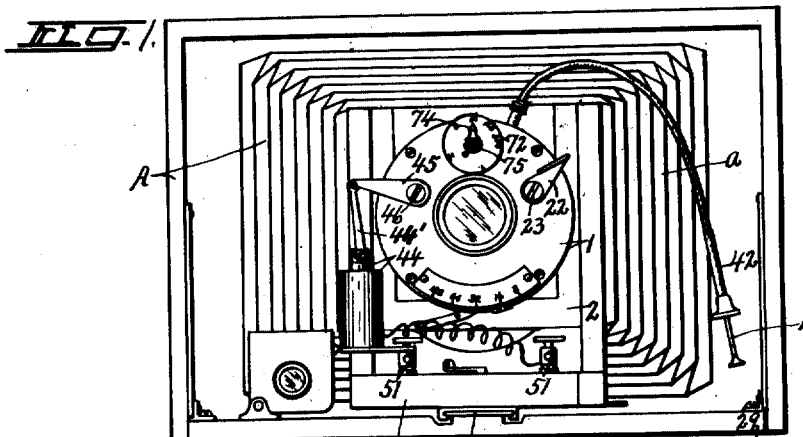
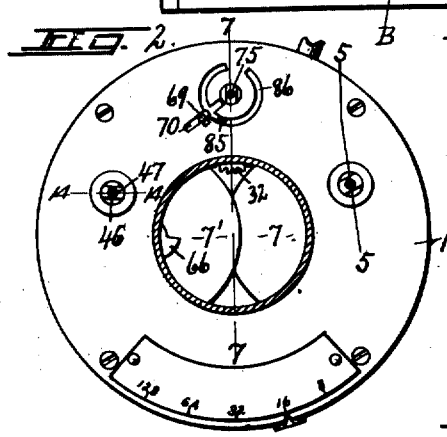
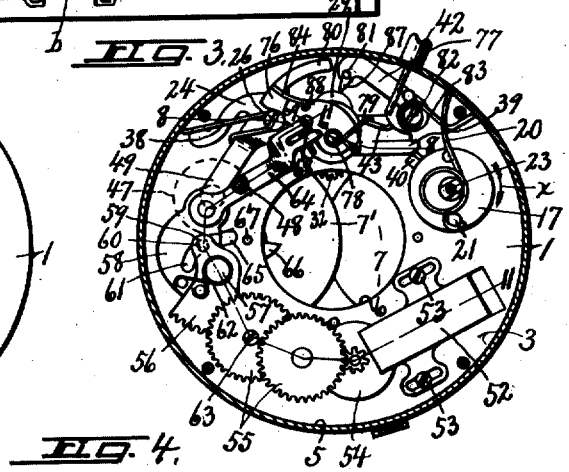
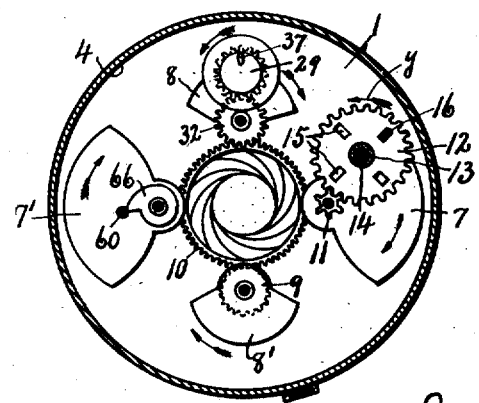
WITNESSES:
INVENTOR
J. A. Ricketts
BY
ATTORNEY.

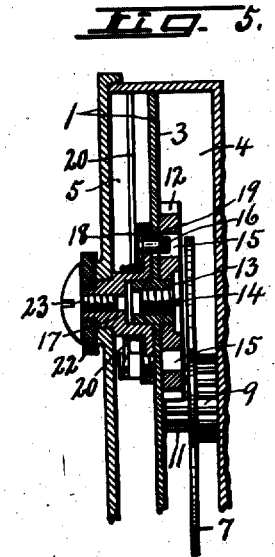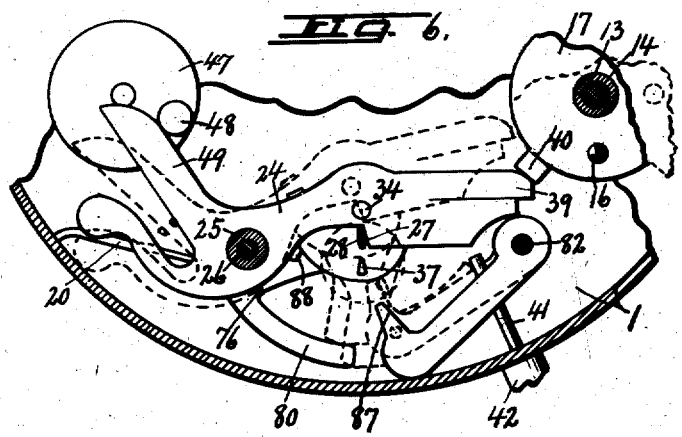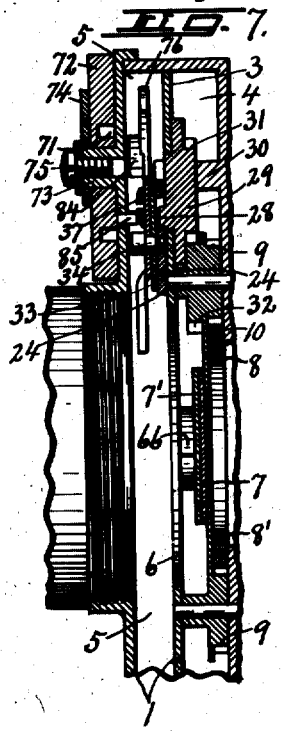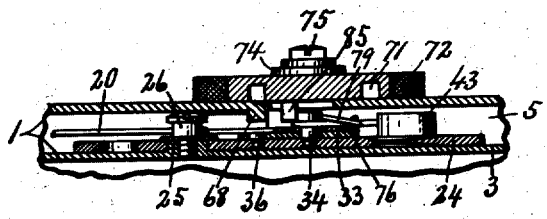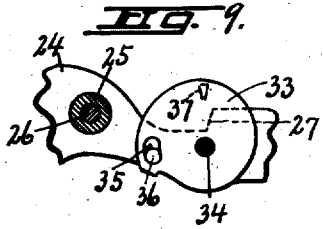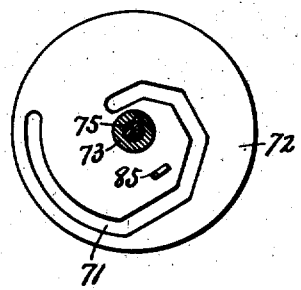

J. A. RICKETTS.
PHOTOGRAPHIC APPARATUS.
APPLICATION FILED MAY 11, 1915.

1,250,354.

Patented Dec. 18, 1917.
3 SHEETS—SHEET 3.

WITNESSES:

INVENTOR.
J. A. Ricketts
BY Howard P. Denison
ATTORNEY.

UNITED STATES PATENT OFFICE.

JOHN A. RICKETTS, OF ROCHESTER, NEW YORK.

PHOTOGRAPHIC APPARATUS.

1,250,354.      Specification of Letters Patent.      Patented Dec. 18, 1917.

Application filed May 11, 1915. Serial No. 27,341.

*To all whom it may concern:*

Be it known that I, JOHN A. RICKETTS, a citizen of the United States of America, and a resident of Rochester, in the county of Monroe, in the State of New York, have invented new and useful Improvements in Photographic Apparatus, of which the following, taken in connection with the accompanying drawings, is a full, clear, and exact description.

This invention relates to certain improvements in photographic apparatus, and more particularly to the shutter operating and controlling mechanism and correlated parts of a camera.

The main object is to render the timing of the exposure automatic and of uniform duration dependent upon the will of the operator.

Other objects and uses relating to specific parts of the apparatus will be brought out in the following description.

In the drawings—

Figure 1 is a front elevation of an open photographic camera embodying the various features of my invention.

Fig. 2 is an enlarged front face view of the shutter case, omitting the time index, setting lever and release lever, and showing the lens tube in section.

Figs. 3 and 4 are sectional views in different planes through the shutter case at right angles to its axis, showing the shutter controlling mechanism in elevation in Fig. 3, and the shutters in Fig. 4 together with the driving mechanism for said shutters and the disk carrying the detent which coöperates with the release lever for controlling the operation of the motor.

Figs. 5 and 7 are enlarged detail sectional views taken, respectively, on lines 5—5 and 7—7, Fig. 2.

Fig. 6 is an enlarged inverted elevation of the release lever, timing levers, showing also the setting and tripping disks, a portion of the shutter case being shown in section, the detent coöperating with the release lever for preventing the action of the motor being also shown in section.

Fig. 8 is a detail sectional view taken on line 8—8, Fig. 3.

Fig. 9 is a detail elevation of a portion of the release lever and timing disk mounted thereon.

Fig. 10 is an enlarged inverted view of the timing index disk.

Figure 11:
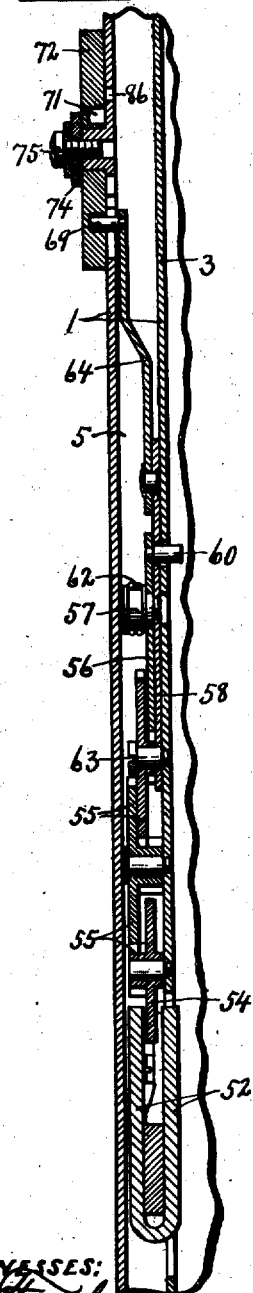

Fig. 11 is an enlarged sectional view taken on line 11—11, Fig. 3.

Figure 12:
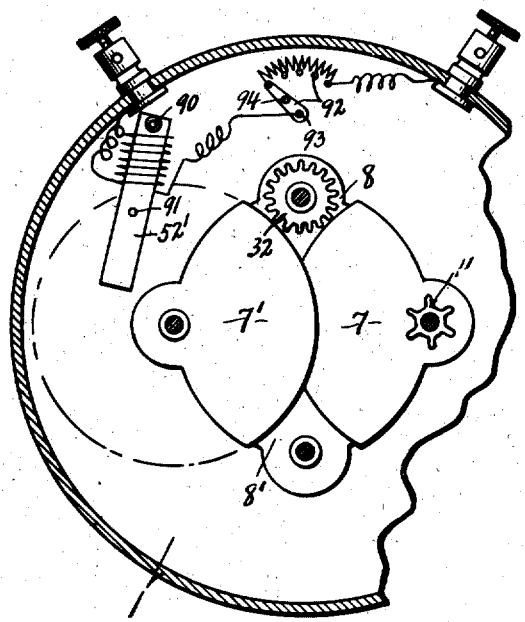

Fig. 12 is an enlarged sectional view through the shutter case at right angles to its axis, showing a modified form of retarding device in which the magnet acts directly upon one of the shutter blades.

Figure 13:
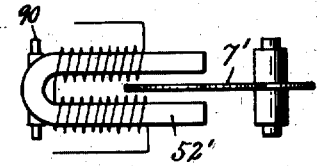

Fig. 13 is a detail elevation of the electromagnet and coöperative shutter shown in Fig. 12.

Figure 14:
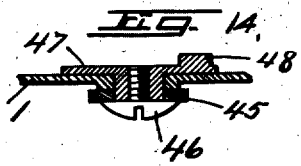

Fig. 14 is a detail sectional view taken on line 14—14 Fig. 2.

My invention is illustrated as used in connection with an ordinary photographic camera of the extensible type having the usual plate holder and ground glass (not shown), and is provided with a shutter case —1— mounted in a suitable frame —2— which is attached to the front end of the extensible portion —*a*— of the case and is adjustable vertically in the usual manner in a suitable frame —B—, the latter being guided in a central longitudinal way —*b*— for backward and forward adjustment of the shutter case and lens holder to properly focus the camera upon an object.

The front and rear plates of the shutter case are provided with the usual central lens tubes and co-axial sight or exposure openings, said case being divided by a partition —3— into separate compartments —4— and —5—, the partition —3— being provided with a central exposure opening —6— co-axial with those in the front and rear plates.

The shutter mechanism is mounted within the compartment —4— and is somewhat similar to that set forth in my Patent No. 778,334, issued Dec. 27, 1904, in that it consists of a series of, in this instance four, shutter blades —7— and —7'— and —8— and —8'—, arranged in pairs, those of each pair being diametrically opposite each other and suitably pivoted to the partition —3— and rear plate of the case at the outer side of the opening —6— to swing to and from a position across said opening, each shutter blade being provided with a co-axial pinion —9— meshing with a central toothed ring —10— by which rotary motion is transmitted from one blade to the other.

All of the shutter blades are preferably made of thin sheet metal and of sufficient combined area to effectively close the central exposure opening in the toothed ring —10— when in their closed positions, the blades —7— and —7'— being disposed in different but juxtaposed planes and of sufficient width to overlap when closed, and for this purpose are approximately elliptical in plan and pivoted in their shorter diameters near one edge, the shorter diameter of each blade being somewhat greater than the distance from its axis to the axis of the shutter case, while its longer diameter is greater than that of the opening in the toothed ring —10—.

The shutter blades —8— and —8'— are approximately quadrants of a circle and of sufficient radius to cover any open space which may exist between the adjacent edges of the blades —7— and —7'— when the blades are closed to exclude light, said blades —8— and —8'— being disposed in the same plane just at the back of, but in close proximity to the rear blade —7—, as shown more clearly in Fig. 7.

The object in making these particular forms of shutters and mounting them in the manner described is to cause them to open from the periphery toward the center of the exposure opening and to close in the same order, but it is evident that various other forms of shutters may be used without departing from the spirit of my invention as will be obvious at the conclusion of this description.

*Shutter motor mechanism.*

In the use of the specific form of shutters just described, suitable motor mechanism is provided for rotating them in one direction only, and for this purpose I have provided the shutter blade —7— with a co-axial pinion —11— meshing with a somewhat larger driving gear —12— which is journaled upon a hub —13— on the partition —3— and is held in place by a clamping screw —14—, as shown more clearly in Fig. 5 so as to lie close to the rear face of said partition, or between the partition and shutter plate —7—.

This driving gear —12— is provided with a plurality of, in this instance four, recesses or openings —15— spaced uniform distances apart about its axis to form ratchet teeth for engagement by an operating pawl —16— which is movable through a guide opening in the main driving or motor disk —17— and is secured to a spring plate —18— on the outer face of the motor disk —17—, as shown in Fig. 5, the inner end of the pawl —16— being passed through an elongated slot —19— in the partition —3— concentric with the axis of movement of the driving gear —12— and motor disk —17—, the latter being journaled in suitable bearings on the partition —3— and outer plate of the shutter case —1— co-axial with the driving gear —12—.

One side of the inner end of the pawl —16— is beveled to cause it to ride against the adjacent side of any one of the openings —15— with which it may be normally interlocked for the purpose of forcing it out of said opening and, therefore, out of interlocking engagement with the gear —12— against the action of the spring plate —18— when the disk —17— is rotated in one direction against the action of a motor spring —20— in setting the motor disk preparatory to operating the shutters through the medium of the gear —12— and pinion —11—.

The motor spring —20— is coiled around the hub of a disk —17— and has one end attached to an eccentric stud or pin —21— on said disk and its other end bearing against the inner face of the shutter case —1—, as shown in Fig. 3, so as to rotate the motor disk opposite to that indicated by arrow —x—.

The outer end of the hub of the disk —17— protrudes through the front plate of the shutter case and is preferably angular in cross section for receiving an operating lever —22— which is held in place by a clamping screw —23—, as shown in Fig. 5.

The ratio of the gear —12— and pinion —11— is, in this instance, four to one, and it, therefore, follows that if the shutters are normally held in a closed position and the gear —12— rotated one-fourth of a revolution, or the distance from one of the recesses —15— to the next adjacent recess, the shutters will be rotated one complete revolution, or opened from their normally closed positions and reclosed in one operation, and that this movement of the gear —12— through a quarter turn is produced by the spring motor —20— when placed under tension by the rotation of the lever —22— and disk —17— a quarter turn from its normal position in the direction indicated by arrow —x—, Fig. 3, thereby registering the pawl —16— with the next adjacent opening or recess —15— so that if the setting lever 22— is then released, it will return the disk —17— and lever —20— to its starting position, and thereby cause the pawl —16— to rotate the gear —12— in the direction indicated by arrow —y— one quarter turn, and thus rotate the shutter blades —7— and —7'— and —8— and —8'— one complete revolution unless stopped in their open positions for time exposures in a manner hereinafter described.

*Shutter stop and release mechanism.*

It is necessary to provide some means for stopping and holding the shutters in a predetermined or normally closed position against the action of the spring motor —20— after the latter has been placed under tension by the operation of the setting lever —22— and also to provide means operable at will for releasing the shutter and its motor mechanism, and for this purpose a lock-and-release lever —24— is pivoted to a hub —25— on the partition —3— within the compartment —5— and is held in place by a clamping screw —26—, said lever being provided with a stop shoulder —27— which is normally engaged by a stud or detent —28— on the outer face of a revoluble disk —29—, as shown more clearly in Figs. 6 and 7, except that the detent only is shown in section in Fig. 6, the disk being omitted.

This disk is journaled in a suitable bearing in the partition —3—, the portion which projects through the bearing being reduced in diameter, while the larger portion at the rear of the partition is held in place between said partition and a bearing —30— on the rear wall of the compartment —4—, said disk being provided on its rear face with a gear —31— meshing with a gear —32— of similar size and preferably secured to the gear —9— on the shutter —8— co-axial therewith so that any movement which is imparted to this shutter will be transmitted to the disk —29—.

It, therefore, follows that if the stop shoulder —27— of the release lever —24— is normally in the path of movement of the detent —28—, the disk —29— and operating mechanism therefor including all the shutter blades will be held in a normal position of rest, in this instance, in their closed position, as shown in Figs. 2 and 3.

It is equally evident that if the release lever —24— were operated to force the stop shoulder —27— out of the path of movement of the detent —28— and held in this position, the shutters would be moved some distance beyond a complete revolution which would, of course, be objectionable, and in order to avoid this condition, a cam disk —33— is pivoted at —34— to the release lever —24— to have a slight rocking movement as limited by a slot —35— and pin —36—, said disk being located on the outer face of the lever and is provided with a rearwardly projecting stop shoulder —37— normally out of the path of movement of the detent —28— and a little to one side of a radial line of the disk —33— passing through the plane of the stop shoulder —27— so as to take the place of said stop shoulder when the release lever is tripped to withdraw the shoulder —27— from holding engagement with the detent —28— in a manner hereinafter described, that is, as soon as the shoulder —27— is withdrawn from holding engagement with the detent —28— to allow the shutters and their operating mechanism to turn from their normal positions, the shoulder —37— is moved into position to be engaged by the detent —28— in case the release lever —24— should be held from its normal position, in which case the stop shoulder —37— would serve the same purpose as the stop shoulder —27— in limiting the movement of the shutters to one revolution until the release lever —24— was allowed to return to its normal position by its retracting spring, as —38—.

Suitable means is provided for preventing the operation of the release lever when the setting lever is in its normal position consisting, in this instance, of a yielding extension —39— on the lever —24— and a radial projection or abutment —40— on the motor disk —17— normally in the path of movement of the end of the extension —39—, as shown more clearly in Fig. 3, the end abutment —40— being beveled on one side to allow it to pass under the spring arm or extension —39— upon the return of the motor disk —17— by the spring —20—.

Any suitable device or devices may be employed for tripping the release lever —24— at the will of the operator, such for example as a flexible plunger —41— passing through a flexible tube —42— on the periphery of the case —1— and adapted to engage a shoulder —43— on the lever, or it may be operated electrically through the medium of a solenoid —44— mounted upon the frame —B— and having its plunger connected by a link —44'— to a lever —45— which is secured by a clamping screw —46— to a revoluble disk —47— shown by dotted lines in Fig. 3, and by full lines in Fig. 6.

This disk is provided with a reduced central portion journaled in a suitable bearing in the front plate of the case —1— with its main body at the inside of said plate, or within the compartment —5— and provided with a stud —48— adapted to engage an extension —49— on the release lever —24— for tripping the latter as the disk is rotated to the left, Figs. 1 and 3, by the downward movement of the lever —45— when the solenoid is energized.

This solenoid is electrically connected to suitable binding posts —51— which in turn may be connected to any suitable battery circuit having an electric switch therein, not necessary to herein illustrate or describe.

*Automatic retard mechanism.*

The opening and closing of the shutters through the medium of the motor mechanism as controlled by the release lever is practically instantaneous, and while I am aware that various forms of timing devices have been heretofore proposed to cause the shutters to remain open greater or less intervals of time according to the will of the operator, it is desirable to provide the apparatus with means whereby the closing movement of the shutters may be automatically retarded to a greater or less degree, as previously regulated by the operator so that when the instrument is once set for a predetermined time of exposure, all exposures will be of the same duration for that particular setting, and I have found that the resistance, torque or magnetic drag acting upon an electric conductor moving in a magnetic field may be used with great efficiency and economy for this purpose, and while this part of my invention is based broadly upon any means which may exert a retarding influence upon any kind of a motor actuated shutter, or upon any part of the apparatus moving in synchronism therewith, I have shown in Figs. 3 and 11 a small permanent magnet —52— adjustably secured by clamping screws —53— to the partition —3— at one side of the opening —6— therein opposite the release lever —24— and arranged so as to exert a retarding influence upon a rotary metal disk —54—, as shown in Figs. 3 and 7, or upon one of the metal shutter blades as —7'—, in a manner somewhat similar to that shown in Figs. 12 and 13, except that in the last named figures, I have shown an electro-magnet —52'— having poles of opposite polarity disposed at opposite sides of the disk so that the latter may travel in the magnetic field which exerts a greater or less drag upon the disk tending to retard its movement.

In like manner, the opposite poles of the permanent magnet —52— are located at opposite sides of the disk —54— to exert a retarding action thereon, due to the magnetic drag produced by the movement of the disk through the magnetic field.

In this particular instance, the disk —54— is adapted to be driven at relatively high speed by a train of gears —55— journaled within the compartment —5— of the case —1—, the end pinion of the gear train meshing with a toothed segment —56— which is pivoted at —57— to a lever —58— and is provided with a heel extension —59— having a rearwardly projecting stud or pin —60— projecting through an elongated slot —61—, the latter being concentric with the axis of the pivot —57—, said segment being operated in one direction relatively to the lever —58— by a retracting spring —62—.

The lever —58— is pivoted to the partition —3— by a pivotal bolt or screw —63— coaxial with the axis of the pinion which meshes with the toothed rack —56— and its opposite end is pivotally connected to a link —64— by which the lever —58— and toothed rack —56— mounted thereon may be rocked about the axis of the pivotal pin —63— in a manner presently described.

The stud or pin —60— on the heel of the toothed segment —56— not only projects through the curved slot —61— in the lever —58— but also extends through an opening —65— in the partition —3— and some distance beyond the inner face thereof so as to permit it to be brought into the path of movement of a cam —66— which is pivoted at —67— to the partition —3— close to the rear face thereof, said cam being secured to the shutter —7'— co-axial therewith to be rotated thereby, as shown more clearly in Figs. 4 and 7.

It is now clear that if the lever —58— is rocked toward the center of the shutter case by the link —64—, the stud or pin —60— will be brought closer to the axis of the cam —66— which is then in its normal position with the shutters closed and the high point of the cam projecting toward the center of the shutter case, as shown in Figs. 2 and 3, and that when the release lever —24— is tripped from its normal position after the spring motor —20— has been placed under tension by the adjustment of the setting lever —22— to allow said motor to operate the shutters through one complete revolution, the simultaneous rotation of the cam —66— by the shutter —7'— will cause said cam to force the pin or stud —60— outwardly, thereby rocking the toothed segment —56— relatively to the lever —58— against the action of its retracting spring —57—, whereby the disk —54— will be rotated by the gear train —55— across the magnetic field of the permanent magnet —52—.

This movement of the disk —54— through the field of the magnet —52— is retarded to a greater or less degree by the magnetic drag or torque acting upon the disk, thereby causing a corresponding retardation of the closing movement of the shutters.

This period of retardation may be varied according to the position of the stud or pin —60— relatively to the axis of the cam —66—, as affected by the adjustment of the lever —58— through the medium of the link —64—, the period of retard being greatest when the stud —60— is shifted nearest to the axis of the cam and least when farthest from said axis, for the reason that when nearest the axis, the toothed segment —56— will be moved through a greater arc and will begin with the opening movement of the shutters and continue through the closing movement of the shutters as the segment is returned by the retracting spring —62—, while on the other hand, if the stud or pin is set farthest from the axis, the arc of movement of the toothed segment —56— will be less and when shifted to its extreme outermost position beyond the path of travel of the cam, the toothed segment —56— and disk —54— driven thereby will remain at rest, and therefore, there will be no retardation of the shutters which will be moved through one revolution and will open and close instantly for instantaneous exposures.

By the use of this retarding means, I am able to obtain a uniform time exposure under all conditions, the duration of the exposure depending upon the position of the stud or pin —60— relatively to the axis of the cam —66—.

Any suitable means may be provided for operating the link —64— to set the pin —60—, and for this purpose, the inner end of the link is forked to receive a guide pin —68— on the inner face of the front plate of the shutter case —1—, one of the arms of the fork being provided with a forwardly projecting pin —69— projecting through a slot 70— in the front plate of the case —1— and into a spiral or eccentric groove —71— on the inner face of an external disk —72—.

This disk —72— is journaled on a forwardly projecting hub —73— on the front plate of the case —1— and its periphery is preferably knurled to permit it to be turned readily by hand.

The front face of the disk is suitably graduated with a fixed index finger —74— which is secured to an angular portion of the hub —73— and together with the disk is held in place by a clamping screw —75—.

The opening —70— through which the pin —69— projects extends radially from the axis of the disk —72— in the direction of extension of the link —64— so that as the disk —72— is rotated, longitudinal motion will be transmitted to the link —64— through the medium of the pin —69— and cam groove —71—, thereby effecting a corresponding rocking movement of the lever —58— to change the position of the pin —60— relatively to the axis of the cam 66— for the purpose previously explained.

*Manually controlled timing mechanism.*

In addition to the automatic timing or retarding mechanism just previously described, suitable means is provided for controlling the time exposures at will, and for this purpose, I have provided a pair of timing levers —76— and —77—, the lever —76— being pivoted at —78— to the release lever —24— to move relatively thereto against the action of a retracting spring —79— and is provided with a circumferentially extending arm —80— for interlocking engagement with a pin —81— on the front end of the timing lever —77—, the latter being pivoted at —82— to the front face of the partition —3— and is yieldingly held in its outermost position by a retracting spring —83—, as shown more clearly in Fig. 3.

The timing lever —76— is provided with an upstanding shoulder —84— adapted to be engaged by a stud or pin —85— on the inner face of the disk —72— and projecting inwardly through a concentric slot —86— in the front plate of the case —1—, as shown more clearly in Fig. 2.

A portion of the cam groove —71— farthest from the axis of the disk —72— is concentric with said axis so that when the disk is adjusted to throw the automatic retarding mechanism out of action, it may still be moved a limited distance without actuating such retarding mechanism, and the stud or pin —85— is so arranged as to engage the upstanding shoulder —84— on the timing lever —76— as soon as the pin —69— of the retarding device enters the concentric portion of the cam groove —71—, whereupon a continued movement of the disk —72— in the same direction will cause the pin or stud —85— to engage the shoulder —84— and rock the timing lever —76— across the outer face of the pin —81— on the timing lever —77—.

Now, when the release lever —24— is shifted from its normal position to permit the motor spring —20— to operate the shutters, the free end of the timing lever —77— will be rocked partially across the front face of the disk —29— and will bring a portion thereof, as —87—, into the path of movement of the shoulder —28— on said disk when the latter has completed substantially a half revolution, thereby permitting a corresponding half revolution of the shutters, leaving the latter in an open position.

When the disk —72— is set in the manner just described for time exposure, its pin or stud —85— will still be in engagement with the shoulder —84— to hold the lever —76— in operative engagement with the pin —81— of the lever —77—, under which conditions, the shoulder —84— will be nearly in a vertical position to allow the release lever —24— and also the timing levers —76— and —77— to move vertically relatively to the shoulder —85— on the disk —72—.

In order that the shutters may be held in their open positions after the return of the release lever —24— and timing levers —76— and —77— to their starting positions, the lever —76— is provided with an additional stop shoulder —88— which is movable into the path of the shoulder —85— just before the portion —87— of the lever —77— is withdrawn from its holding position on the return of the release lever by its retracting spring —38—, so that at the end of a predetermined time exposure, the release lever may be again operated through either of its tripping devices, previously described, to withdraw the stop shoulder —88— from holding engagement with the shoulder —85—, thereby allowing the disk —29— to complete its revolution under the action of the spring motor —20— for closing the shutters.

It will be evident from the foregoing description that when the timing levers —76— and —77— are set for indefinite time exposures, the automatic timing mechanism is prevented from operation, while on the other hand, when the automatic timing mechanism is adjusted for use, it will be impossible to set the timing levers —76— and —77— for indefinite exposures, thus making the operation of one timing mechanism dependent upon the position of the other.

Referring again to the retarding mechanism, and more particularly to the electromagnet, shown in Fig. 12, it may be desirable under some conditions to pivot the magnet at —90— to the frame or shutter case and to vary its retarding influence upon the disk —7'— by shifting its position, which may be done by the disk —72— through the medium of the link —64— by connecting said link at a point as —91— to one of the poles of the magnet, or if a rheostat, as —92— is to be used to control the current energy of the electro-magnet and thereby control its retarding influence upon the shutter —7'—, the movable arm as —93— of the rheostat may also be connected as at —94— to the link —64—.

It is obvious that the rotary disk —54— or its equivalent and the magnet —52— or —52'— may be used in connection with panoramic cameras for regulating the speed of movement of one of the motor-driven exposure-controlling elements, and thereby establishing uniform time exposures under a predetermined relative adjustment of the disk and magnet, and therefore, I do not wish to limit this part of my invention to its use in connection with shutters.

For example, the axial spindle upon which the disk —54— is mounted might be the turning pivot of the swinging lens holder or film support of any well known form of panoramic camera, or said spindle might be geared to either of those swinging parts in any other suitable manner within the range of mechanical skill, whereby the movement of such swinging part would transmit motion to the disk.

While I have shown and described specific mechanisms for carrying out the various objects of my invention, I do not wish to limit myself to the precise construction shown and described, because it is evident that the various mechanisms may be varied materially without departing from the spirit of my invention.

What I claim is:

1. In a photographic apparatus, motor-actuated parts including a rotary shutter, and magnetic means acting upon one of said parts for partially counteracting the influence of the motor on the shutter.

2. In combination with motor-driven mechanism including the rotary shutters of a camera and a magnet, a part of said mechanism being movable in the field of the magnet.

3. In a photographic apparatus, the combination with rotary shutter blades and means for driving them in one direction only, of electric means for partially counteracting the effect of the driving means upon the shutter blades.

4. In a photographic apparatus, a magnet having its poles in opposed relation, and motor-driven exposure-controlling mechanism including a rotary shutter having a portion thereof revoluble between said poles.

5. In a photographic apparatus, the combination with motor-driven exposure-controlling means including a plurality of shutter blades, of coöperative magnetic means governing the speed of movement of the first named means.

6. In a photographic apparatus, means for timing an exposure comprising a plurality of rotary shutter blades, a motor-driven electric conductor, and coöperative means for exerting magnetic influence upon said conductor to control its speed of movement.

7. In a photographic shutter, the combination of a shutter case having an exposure opening, a plurality of rotary members in said case, some of which members are shutters normally closing said opening, means including a spring for rotating said members to open the shutters and return them to their closed positions in one continuous movement, and magnetic means coacting with one of the rotary members to retard the speed of the shutters during said continuous movement.

8. In a photographic shutter, the combination of a shutter case having an exposure opening, a plurality of rotary members in said case, some of which members are shutters normally closing said opening, means including a spring for rotating said members to open the shutters and return them to their closed positions in one continuous movement, magnetic means coacting with one of the rotary members to retard the speed of the shutters during said continuous movement, and automatic means for stopping the rotary members at the end of said movement.

9. In a photographic shutter, the combination of a shutter case having an exposure opening, a plurality of rotary members in said case, some of which members are shutters normally closing said opening, means including a spring for rotating said members to open the shutters and return them to their closed positions in one continuous movement, means for detaining said members against movement by the spring, means operable at will for tripping the detaining means, and magnetic means for retarding the speed of movement of said members by the spring.

10. In a photographic shutter, the combination of a shutter case having an exposure opening, a plurality of rotary members in said case, some of which members are shutters normally closing said opening, means including a spring for rotating said members to open the shutters and return them to their closed positions in one continuous movement, means for detaining said members against movement by the spring, means operable at will for tripping the detaining means, magnetic means for retarding the speed of movement of said members by the spring, and automatic means for restoring the detaining means to stop said members at the end of said continuous movement.

11. In a photographic shutter, the combination of a shutter case having an exposure opening, a plurality of rotary members in said case, some of which members are shutters normally closing said opening, means including a spring for rotating said members to open the shutters and return them to their closed positions in one continuous movement, means for detaining said members against movement by the spring, means operable at will independently of the shutter members for placing the spring under increased tension, means for locking said spring-tensioning means in its tensioning position to one of the first-named rotary members, means operable at will for tripping said detaining means to allow the rotary members to be operated by the spring and to permit the spring-tensioning means to be returned to its starting position, automatic means for restoring the detaining means to its detaining position for stopping the shutters at the end of said continuous movement, and magnetic means for retarding the speed of said members during said continuous movement.

12. In a photographic shutter, the combination of a shutter case having an exposure opening, rotary shutters normally closing said opening, motor-driven means for opening said shutters and returning them to their closed positions in one continuous operation, a retarding device including a magnet and an electric conductor movable in the field of said magnet, means for transmitting motion from the shutter-actuating means to said conductor including means for varying the period of operation of the conductor during said continuous movement of the shutters.

13. In a photographic shutter, the combination of a shutter case having an exposure opening, a plurality of normally closed shutter blades pivotally mounted within the case around said opening, and means for opening said blades and returning them to their closed position in one continuous operation comprising a rotary, spring-actuated driving member and a rotary driven member, the driving member being adjustable rotarily relatively to the driven member and provided with means for interlocking engagement therewith at different points around its axis, and means operable at will for effecting said rotary adjustment of the driving member against the action of said spring to cause its interlocking engagement with the driven member, whereby both members will be rotated by the spring to operate the shutter blades when the last-named means is released.

14. In a photographic shutter, the combination of a shutter case having an exposure opening, a plurality of shutter blades pivotally mounted within the case around said opening and normally closed, a rotary, spring-actuated driving member, driven means for transmitting motion from said driving member to the shutters for opening the same and returning them to their closed positions, said driving member being adjustable rotarily relatively to the driven means for tensioning the spring and provided with means for interlocking engagement with different portions of one of the parts of the driven means for imparting motion to said driven means after the spring is placed under tension, a locking member coöperating with one of the parts of said driven means for detaining the same against operation by the driving member, coöperative means between the driving member and locking member for preventing the tripping of said locking member when the driving member is in its normal position and for releasing the locking member when the driving member is adjusted to tension the spring, and additional means operable at will for tripping the locking member to release the driven means and permit it to be operated by the driving member when the latter is released after tensioning the spring.

In witness whereof I have hereunto set my hand this 30th day of April, 1915.

JOHN A. RICKETTS.

Witnesses:
CHAS. O. WORTMAN,
LOREN N. ROBBINS.